United States Patent
Vaidya et al.

(10) Patent No.: US 12,539,175 B2
(45) Date of Patent: Feb. 3, 2026

(54) 3D TRACKING OF INTERVENTIONAL MEDICAL DEVICES

(71) Applicant: KONINKLIJKE PHILIPS N.V., Eindhoven (NL)

(72) Inventors: Kunal Vaidya, Boston, MA (US); Ameet Kumar Jain, Boston, MA (US); Ramon Quido Erkamp, Swampscott, MA (US); Shyam Bharat, Arlington, MA (US); Alvin Chen, Cambridge, MA (US); Francois Guy Gerard Marie Vignon, Andover, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1082 days.

(21) Appl. No.: 17/269,855

(22) PCT Filed: Aug. 13, 2019

(86) PCT No.: PCT/EP2019/071635
§ 371 (c)(1),
(2) Date: Feb. 19, 2021

(87) PCT Pub. No.: WO2020/038758
PCT Pub. Date: Feb. 27, 2020

(65) Prior Publication Data
US 2021/0251697 A1 Aug. 19, 2021

Related U.S. Application Data

(60) Provisional application No. 62/721,196, filed on Aug. 22, 2018.

(51) Int. Cl.
*A61B 5/00* (2006.01)
*A61B 34/20* (2016.01)

(52) U.S. Cl.
CPC ...... *A61B 34/20* (2016.02); *A61B 2034/2063* (2016.02); *A61B 2562/0204* (2013.01)

(58) Field of Classification Search
CPC ..... A61B 8/5253; A61B 8/145; A61B 8/0841; A61B 2034/2063; A61B 2017/3413
See application file for complete search history.

(56) References Cited

U.S. PATENT DOCUMENTS 6,336,899 B1  1/2002  Yamazaki
6,733,458 B1*  5/2004  Steins .................. A61B 8/4254
                                                          600/461

(Continued)

FOREIGN PATENT DOCUMENTS

JP  2016531713 A  10/2016
WO  2017194314 A1  11/2017

OTHER PUBLICATIONS

International Search Report and Written Opinion of PCT/EP2019/071635, dated Oct. 29, 2019.

(Continued)

*Primary Examiner* — Rajeev P Siripurapu (57) ABSTRACT

A controller (210) for tracking an interventional medical device (252) in three dimensions includes a memory (212) that stores instructions, and a processor (211) that executes the instructions. When executed by the processor (211), the instructions cause the controller (210) to execute a process. The process includes determining (S320/S420), based on an elevation plane in an ultrasound X-plane mode, a first two-dimensional location of the interventional medical device (252) in the elevation plane. The process also includes determining (S320/S422), based on an azimuthal plane in the ultrasound X-plane mode, a second two-dimensional location of the interventional medical device (252) in the azimuthal plane. The process moreover includes determining (S330/S430), based on the first two-dimensional (Continued)

location and the second two-dimensional location, a three-dimensional location of the interventional medical device (252). Finally, the process includes modifying (S340/S440) ultrasound beam patterns fired in the ultrasound X-plane mode based on the three-dimensional location of the interventional medical device (252).

19 Claims, 8 Drawing Sheets

(56) References Cited

U.S. PATENT DOCUMENTS

| | | | | |
|---|---|---|---|---|
| 2013/0158405 A1* | 6/2013 | Bagge | ................... | A61B 8/481 600/447 |
| 2015/0359512 A1* | 12/2015 | Boctor | ................ | G01S 15/8997 600/447 |
| 2016/0143615 A1 | 5/2016 | Tahmasebi et al. | | |
| 2016/0324501 A1 | 11/2016 | Vignon | | |
| 2016/0324584 A1 | 11/2016 | Tahmasebi Maraghoosh | | |
| 2017/0164931 A1 | 6/2017 | Ng | | |
| 2017/0202625 A1* | 7/2017 | Bharat | ................. | A61B 8/5261 |
| 2018/0263593 A1* | 9/2018 | Dickie | .................... | A61B 8/54 |

OTHER PUBLICATIONS

Xiong, Y. et al "Real-Time Three-Dimensional Ultrasound with Live xPlane Imaging Assists First-Trimester Acquisition of a True Medsagittal Section", Ultrasound Obstet Gynecol. vol. 36, 2010, pp. 136-140.

Van Den Bosch et al. "Revealing new insights iRotate electronicrotation and xPlaneadjustable biplane imaging", Philips Ultrasoundcardiology iRotate and xPlane, Koninklijke Philips N.V., and [online], 2017 and pp. 1-8, [Reiwa 5 Feb. 9, 2023 search], Internet <URL: https://www.USA.philips.com/c-dam/b2bhc/master/ultrasound/general-imaging/pdfs/white-paper-revealing-new-insights.PDF.

* cited by examiner

3D TRACKING OF INTERVENTIONAL MEDICAL DEVICES

CROSS-REFERENCE TO PRIOR APPLICATIONS

This application is the U.S. National Phase application under 35 U.S.C. § 371 of International Application No. PCT/EP2019/071635, filed on Aug. 13, 2019, which claims the benefit of U.S. Provisional Patent Application Ser. No. 62/721,196, filed Aug. 22, 2018. These applications are hereby incorporated by reference herein in their entirety.

BACKGROUND

An interventional medical device such as a needle can be tracked using an ultrasound probe that transmits ultrasound beams to the interventional medical device. Localization of the interventional medical device in an ultrasound image may be hampered if the interventional medical device lacks echogenic properties, and is therefore poorly visible in the ultrasound image. To resolve this issue, a piezoelectric sensor can be applied on or in the interventional medical device, preferably close to the device tip insofar as a user is typically interested in the location of the device tip. The piezoelectric sensor is a passive ultrasound sensor (e.g., PZT, PVDF, copolymer or other piezoelectric material) and is placed on or in the interventional medical devices. The passive ultrasound sensor passively listens to and measures the incident ultrasound waves of the ultrasound beams without responding as the ultrasound beams sweep the field of view of a diagnostic B-mode ultrasound imaging field. Analysis of the resultant measurements yields an estimate of the position of the passive ultrasound sensor on the interventional medical device in the frame of reference of the field of view of the diagnostic B-mode ultrasound image. Specifically, time-of-flight measurements provide the axial/radial distance of the passive ultrasound sensor from the imaging array, while amplitude measurements and knowledge of the beam firing sequence provide the lateral/angular position of the passive ultrasound sensor. The position of the device tip can then be overlaid on the ultrasound image for enhanced visualization of the interventional medical device, and the positions and their histories can be logged for tracking and other applications. An interventional medical device is typically tracked using a single ultrasound probe.

Figure 1:
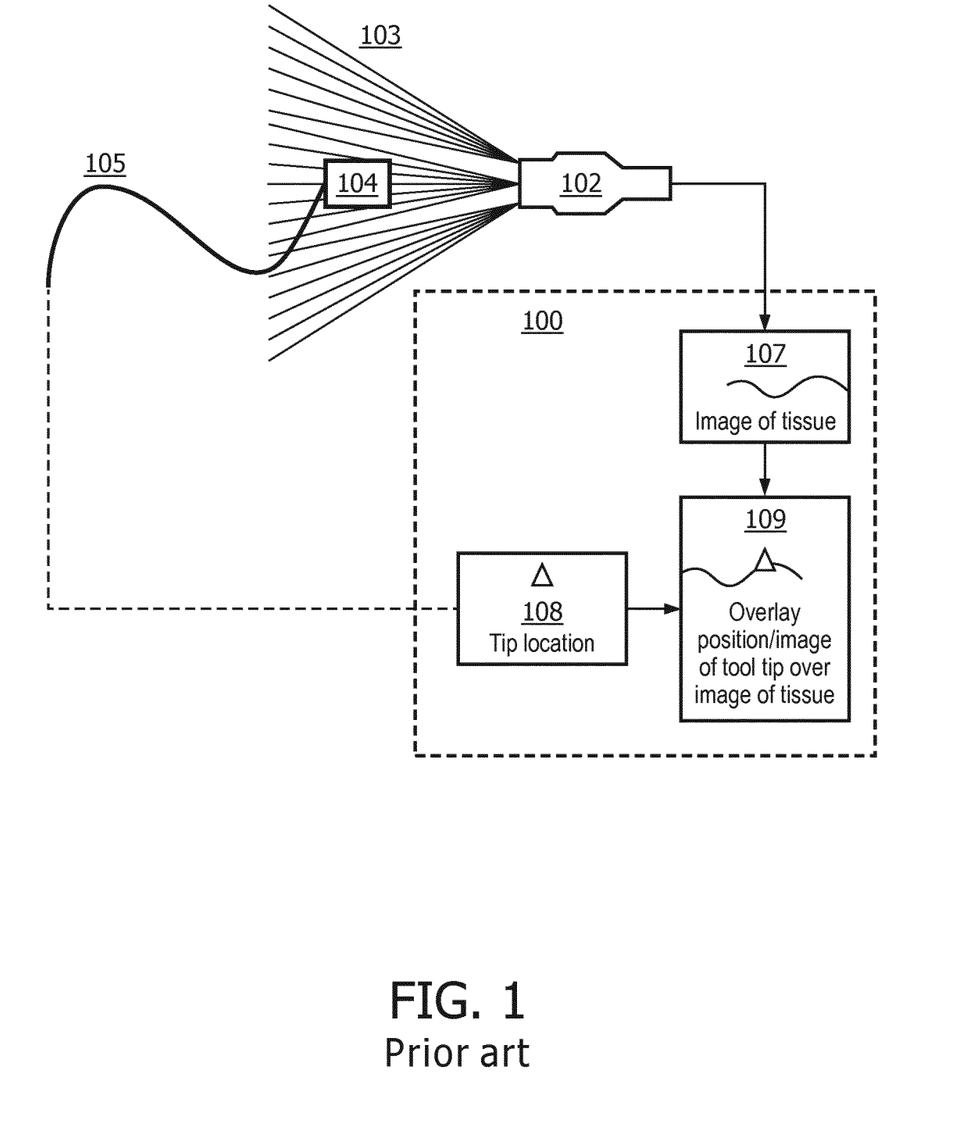
FIG. 1 illustrates a known system for tracking an interventional medical device using a passive ultrasound sensor.

FIG. 1 illustrates a known system for tracking an interventional medical device using a passive ultrasound sensor. In FIG. 1, an ultrasound probe 102 emits an imaging beam 103 that sweeps across a passive ultrasound sensor 104 on a tool tip of an interventional medical device 105. Here, interventional medical device 105 may be the needle. An image of tissue 107 is fed back by the ultrasound probe 102. A location of the passive ultrasound sensor 104 on the tool tip of the interventional medical device 105 is provided as a tip location 108 upon determination by a signal processing algorithm. The tip location 108 is overlaid on the image of tissue 107 as an overlay image 109. The image of tissue 107, the tip location 108, and the overlay image 109 are all displayed on a display 100.

Separate from the above, though three-dimensional ultrasound images provide good context for an interventional medical procedure, three-dimensional ultrasound images may be complex to interpret. As a result, interventionalists sometimes rely on two-dimensional X-planes to better understand the anatomy. Live X-plane imaging creates two full-resolution planes simultaneously, allowing capture of twice as much clinical information in the same amount of time as two-dimensional imaging using a single plane. A large part of some interventional procedures can be done with X-planes. The workflow involves steering the X-planes to the region of interest by manually sweeping through the three-dimensional volume until the anatomy and interventional medical device are in view. This workflow can be complicated and time consuming.

SUMMARY

According to an aspect of the present disclosure, a controller for tracking an interventional medical device in three dimensions includes a memory that stores instructions, and a processor that executes the instructions. When executed by the processor, the instructions cause the controller to execute a process. The process includes determining, based on an elevation plane in an ultrasound X-plane mode, a first two-dimensional location of the interventional medical device in the elevation plane. The process also includes determining, based on an azimuthal plane in the ultrasound X-plane mode, a second two-dimensional location of the interventional medical device in the azimuthal plane. The process moreover includes determining, based on the first two-dimensional location and the second two-dimensional location, a three-dimensional location of the interventional medical device. Finally, the process includes modifying ultrasound beam patterns fired in the ultrasound X-plane mode based on the three-dimensional location of the interventional medical device.

According to another aspect of the present disclosure, a method for tracking an interventional medical device in three dimensions includes determining, based on an elevation plane in an ultrasound X-plane mode, a first two-dimensional location of the interventional medical device in the elevation plane. The method also includes determining, based on an azimuthal plane in the ultrasound X-plane mode, a second two-dimensional location of the interventional medical device in the azimuthal plane. The method moreover includes determining, based on the first two-dimensional location and the second two-dimensional location, a three-dimensional location of the interventional medical device. Finally, the method includes modifying, by a controller that includes a memory that stores instructions and a processor that executes the instructions, ultrasound beam patterns fired in the ultrasound X-plane mode based on the three-dimensional location of the interventional medical device.

According to still another aspect of the present disclosure, a system for tracking an interventional medical device in three dimensions includes an interventional medical device, an ultrasound probe, and a controller. The ultrasound probe captures imagery in a space that includes the interventional medical device. The controller includes a memory that stores instructions and a processor that executes the instructions. When executed by the processor, the instructions cause the controller to execute a process that includes determining, based on an elevation plane in an ultrasound X-plane mode, a first two-dimensional location of the interventional medical device in the elevation plane. The process also includes determining, based on an azimuthal plane in the ultrasound X-plane mode, a second two-dimensional location of the interventional medical device in the azimuthal plane. The process moreover includes determining, based on the first two-dimensional location and the second two-dimensional location, a three-dimensional location of the interventional medical device. Finally, the process includes modifying ultrasound beam patterns fired in the ultrasound X-plane mode based on the three-dimensional location of the interventional medical device.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only, and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

As described herein, when a three-dimensional ultrasound probe (i.e., an ultrasound transducer capable of imaging in three dimensions) is used, the estimated location of a passive ultrasound sensor can be identified in three dimensions. The estimated location is inherently in the coordinate system of the three-dimensional ultrasound probe. However, when an interventionalist relies on two-dimensional X-planes (e.g., to better understand the anatomy), the X-planes can be steered to find the interventional medical device and/or the anatomy, and afterwards can be steered to follow the interventional medical device and/or the anatomy. The teachings described below provide an ability to track the interventional medical device and get a live three-dimensional position in the ultrasound co-ordinates space in real-time by tracking the passive ultrasound sensor. Resultingly, the process of steering the X-planes for the desired view can be automated and the workflow simplified so as to maintain views of the interventional medical device and/or the anatomy through multiple emissions of ultrasound beams in the X-plane mode while also accurately tracking the interventional medical device in three dimensions.

Figure 2A:
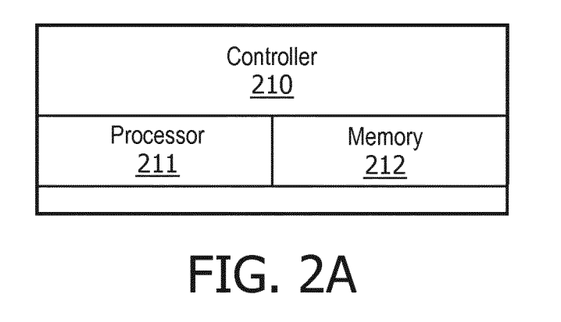
FIG. 2A illustrates a controller for 3D tracking of interventional medical devices, in accordance with a representative embodiment.

FIG. 2A illustrates a controller for 3D tracking of interventional medical devices, in accordance with a representative embodiment.

In FIG. 2A, a controller 210 includes a processor 211 and a memory 212. The memory 212 stores instructions, and the processor 211 executes the instructions. When executed by the processor 211, the instructions cause the controller 210 or a device or system that includes the controller 210 to perform processes as described herein.

Figure 2B:
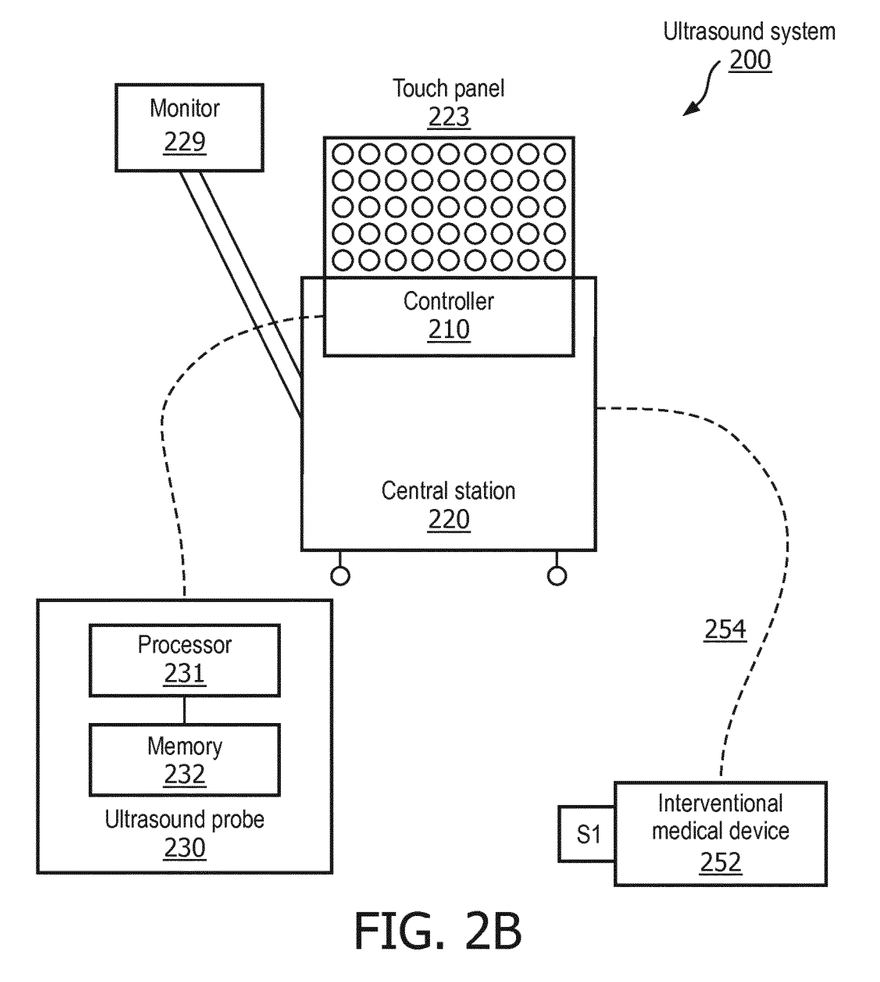
FIG. 2B illustrates a system for 3D tracking of interventional medical devices, in accordance with a representative embodiment.

FIG. 2B illustrates a system for 3D tracking of interventional medical devices, in accordance with a representative embodiment.

In FIG. 2B, an ultrasound system 200 includes a central station 220 with a controller 210, a touch panel 223, a monitor 229, and an interventional medical device 252 connected to the central station 220 by a data connection 254 (e.g., a wired or wireless data connection). An ultrasound probe 230 includes a memory 232 that stores instructions and a processor 231 that executes the instructions. In the context of FIG. 2B, the controller 210 may be alternatively implemented using the memory 232 and processor 231 of the ultrasound probe 230, or other combinations of memory and processor provided independently or in other apparatuses or systems in the environment of the ultrasound system 200. That is, a "controller" as described herein may be implemented in a variety of forms, either by modifying an existing system or type of system, or by providing a new system or type of system such as a stand-alone module.

The interventional medical device 252 may be provided at the end of a wire or similar instrument. The interventional medical device 252 is inserted into a patient during a medical intervention managed by a human interventionalist. The interventional medical device 252 may be, for example, an intravascular ultrasound probe that produces ultrasound imagery, though sensor signals from a passive ultrasound sensor S1 on the interventional medical device 252 are the signals of interest relative to the interventional medical device 252 for the purposes of this description.

More particularly, in the embodiment of FIG. 2, a passive ultrasound sensor S1 is provided on the interventional medical device 252. The passive ultrasound sensor signals from the passive ultrasound sensor S1 are synchronized with ultrasound imagery from the ultrasound probe 230. Time-of-flight measurements provide the axial/radial distance of the passive ultrasound sensor S1 from the ultrasound probe 230. Amplitude measurements and knowledge of the beam firing sequence may provide the lateral position of the passive ultrasound sensor S1. Since phase can correspond to time-of-flight, phase may be used instead of time-of-flight insofar as phase may provide higher measurement precision.

The monitor 229 may display both two-dimensional positions of the passive ultrasound sensor S1 obtained in X-plane mode, such as side by side images from each of the two planes in X-plane mode. The monitor 229 may also display the three-dimensional position of the passive ultrasound sensor S1 obtained based on both two-dimensional positions and an inter-plane angle between the two planes in the X-plane mode.

Figure 8A:
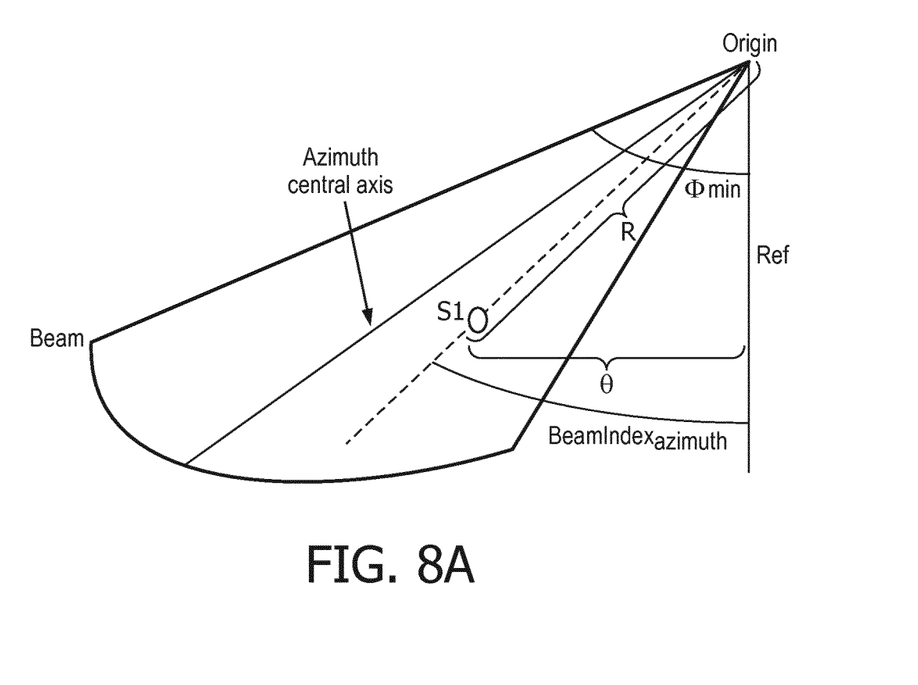
FIG. 8A illustrates geometry for computing a 3D position using 2D positions from azimuth and elevation planes in 3D tracking of interventional medical devices, in accordance with a representative embodiment.
Figure 8B:
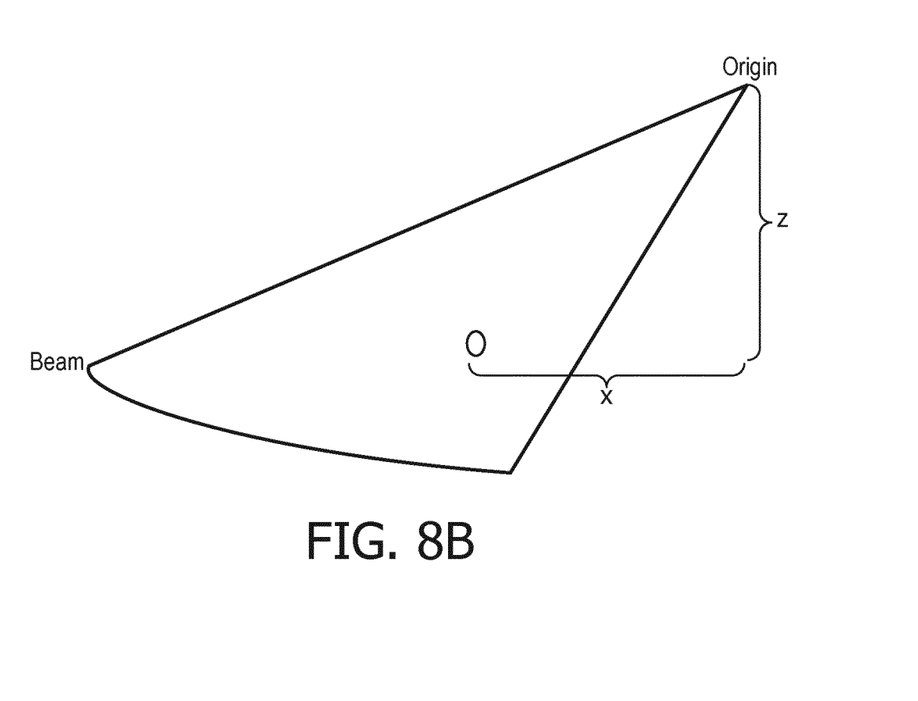
FIG. 8B illustrates additional geometry for computing a 3D position using 2D positions from azimuth and elevation planes in 3D tracking of interventional medical devices, in accordance with a representative embodiment.

An explanation of how to obtain a three-dimensional position from a pair of planes in X-plane mode is detailed with respect to FIGS. 8A and 8B and elsewhere herein. Briefly, however, since the planes have a known relationship (i.e., an inter-plane angle and common origin), the two-dimensional location of the passive ultrasound sensor S1 can be translated into a three-dimensional location when the two-dimensional location is identifiable in both of the two-dimensional planes.

The monitor 229 also displays the conventional imagery otherwise obtained using ultrasound probes such as ultrasound probe 230, including ultrasound imagery of regions of interest of human anatomy and/or interventional medical device 252.

When multiple piezoelectric elements (e.g., PZT) are provided for the passive ultrasound sensor S1, the measurements can be averaged to provide an overall position of the interventional medical device 252. Additionally, since relative positional arrangements of the piezoelectric elements may be known in this case, the overall relative pose, 3-dimensional directionality, and even a predicted trajectory of the interventional medical device 252 can also be determined from the relative measurements.

By way of explanation, the interventional medical device 252 is placed internally into a patient during a medical procedure. Locations of the interventional medical device 252 can be seen on imagery generated by the ultrasound probe 230.

Figure 3:
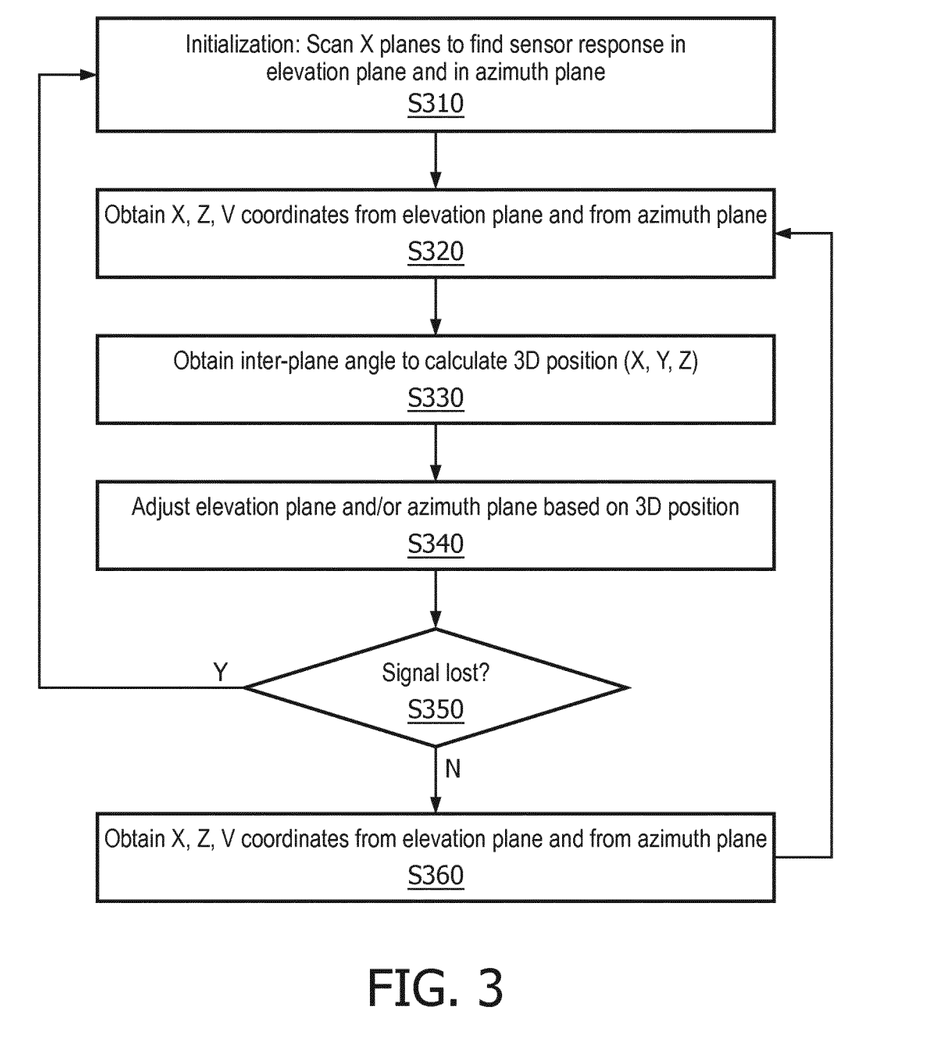
FIG. 3 illustrates a method for 3D tracking of interventional medical devices, in accordance with a representative embodiment.

FIG. 3 illustrates a method for 3D tracking of interventional medical devices, in accordance with a representative embodiment.

In the embodiment of FIG. 3, the process starts at S310 with an initialization, wherein the X-planes are scanned using ultrasound beams emitted by the ultrasound probe 230 in the X-plane mode to find the response of the passive ultrasound sensor S1 in the elevation plane and the azimuth plane. The elevation plane is a plane formed at an angle from a horizontal line (from the viewpoint of the ultrasound probe 230) to the passive ultrasound sensor S1. The azimuth plane is a plane formed at an angle from a fixed vertical reference (from the viewpoint of the ultrasound probe 230) to the passive ultrasound sensor S1.

The initialization at S310 can be performed in several ways. For example, a live three-dimensional image can be used to initialize the X-plane scan in real-time. Alternatively, the X-planes can be manually adjusted for the initialization until the interventional medical device 252 is found, after which the X-planes can be set to automatically follow the interventional medical device. in another embodiment, the X-planes can be automatically steered, such as at multiple different angles in an iterative process until the interventional medical device 252 is found.

At S320, the two-dimensional coordinates X and Z are obtained along with a voltage reading V from the response of the passive ultrasound sensor S1 in the elevation plane and the azimuth plane.

At S330, an inter-plane angle between the elevation plane and the azimuth plane is obtained. The inter-plane angle is used together with the two-dimensional coordinates X and Z from each of the elevation plane and the azimuth plane to calculate the 3-dimensional coordinates X, Y and Z of the three-dimensional position.

At S340, the elevation plane and/or the azimuth plane are adjusted based on the three-dimensional position. That is, the two planes of the X-plane are adjusted based on the three-dimensional position. The adjustment of the two planes of the X-plane is part of a recursive pattern of determining the two-dimensional positions to determine the three-dimensional position, and then using the three-dimensional position to adjust the two planes of the X-plane.

At S350, a determination is made as to whether the signal from the passive ultrasound sensor S1 has been lost. If the signal has been lost (S350=Yes), the process returns to S310 and restarts so as to find the sensor response in the elevation plane and in the azimuth plane.

If the signal has not been lost (S350=Now), the process continues at S360 by obtaining the two-dimensional coordinates X and Z from the passive ultrasound sensor S1 in the elevation plane and the azimuth plane. The voltage reading V is unnecessary at S360 since the signal from the sensor has not been lost. That is, at S360 the process is not looking for the best voltage reading V from a scan in order to identify the best initial elevation plane and azimuth plane to use as was the case in S310 and S320. Accordingly, the two-dimensional coordinates X and Z are obtained from the ultrasound sensor at S360, and then the process returns to S330 so as to obtain the inter-plane angle to calculate the three-dimensional coordinates X, Y and Z of the three-dimensional position.

Figure 4:
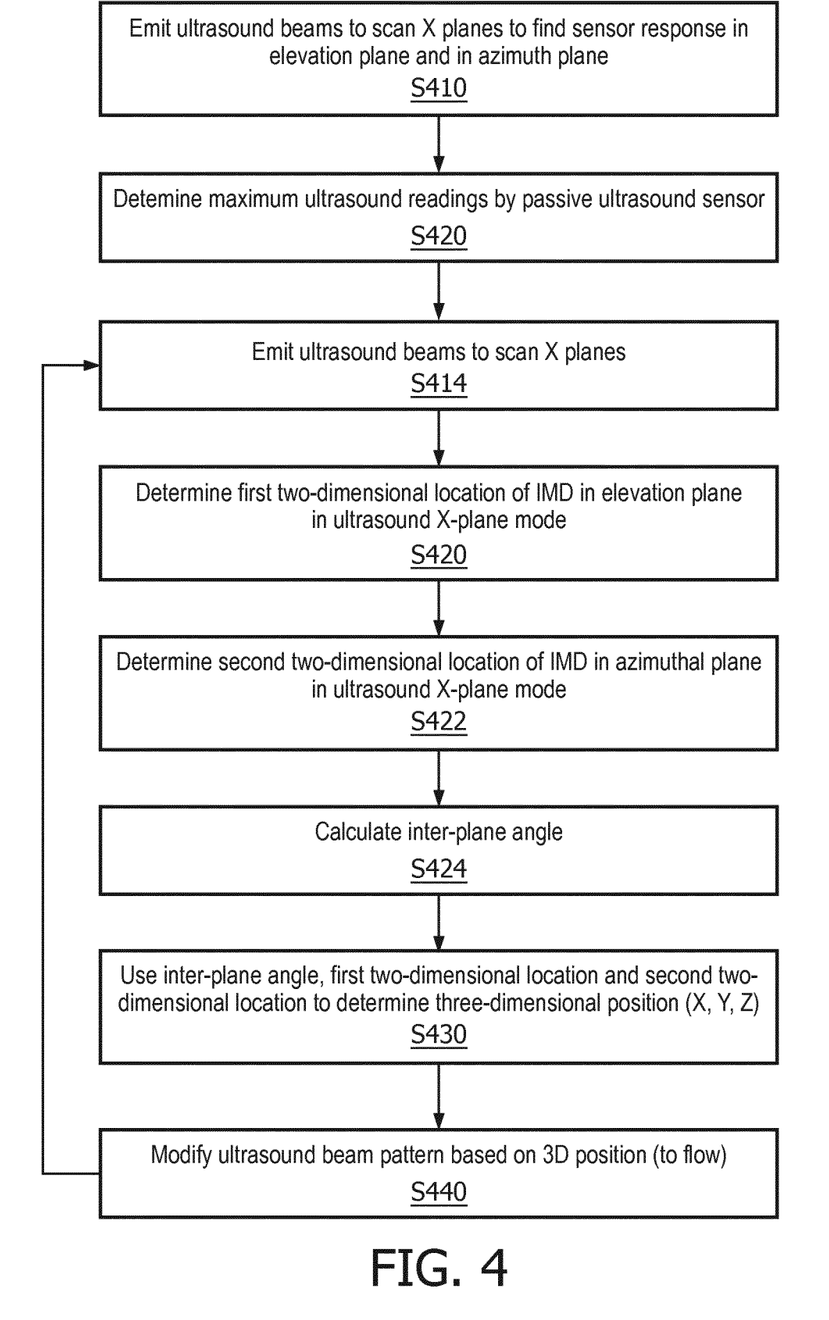
FIG. 4 illustrates another method for 3D tracking of interventional medical devices, in accordance with a representative embodiment.

FIG. 4 illustrates another method for 3D tracking of interventional medical devices, in accordance with a representative embodiment.

In FIG. 4, the process starts at S410 when ultrasound beams are emitted to scan X-planes through the three-dimensional volume to find the sensor response in the elevation plane and the azimuth plane. That is, the ultrasound beams may be fired in a sequence of different directions. The X-planes are therefore emitted in multiple different combinations in order to identify the combination of elevation plane and azimuth plane that result in the maximum voltage V being read at the passive ultrasound sensor S1 as a maximum sensor response.

At S412, readings by the passive ultrasound sensor S1 are analyzed to identify the maximum voltage reading V as the maximum voltage reading V will correspond to the elevation plane and the azimuth plane to use as a starting point in the iterative process that follows. The maximum voltage reading V is a maximum sensor signal, and may be determined from a series of tens, hundreds, thousands or even more sequential voltage readings by the passive ultrasound sensor S1. As described below, a first two-dimensional location of the interventional medical device 252 in the elevation plane and a second two-dimensional location of the interventional medical device 252 in the azimuthal plane can be determined based on ultrasound readings from a passive ultrasound sensor S1 on the interventional medical device. The ultrasound readings are analyzed to identify the maximum voltage reading V such that the two two-dimensional locations are based on the ultrasound readings.

At S414, ultrasound beams are emitted to scan the X-planes to start the iterative process. The ultrasound beams emitted at S414 are emitted in the elevation plane and azimuth plane corresponding to the maximum voltage reading V from S412.

At S420, the first two-dimensional location of the interventional medical device 252 is determined in the elevation plane in the ultrasound X-plane mode. The two-dimensional coordinates X, Z identified in the elevation plane may be considered a first set of two-dimensional coordinates.

At S422, the second two-dimensional location of the interventional medical device 252 is determined in the azimuthal plane in the ultrasound X-plane mode. The two-dimensional coordinates X, Z identified in the azimuthal plane may be considered a second set of two-dimensional coordinates.

At S424, the inter-plane angle between the elevation plane and the azimuthal plane is calculated.

At S430, the inter-plane angle, first two-dimensional location and second two-dimensional location are used to determine the three-dimensional position X, Y, Z.

At S440, the ultrasound beam pattern is modified based on the three-dimensional position X, Y, Z determined at S430 to follow the interventional medical device. For instance, a difference between the last three-dimensional position and the current three-dimensional position may be used to adjust the ultrasound beam pattern to better fit the current three-dimensional position. Moreover, a change in the last three-dimensional position and the current three-dimensional position may be used to calculate a trajectory of the interventional medical device, so that the modified beam pattern may attempt to lead or meet the interventional medical device. Here, the concepts of following, leading or meeting the interventional medical device 252 may mean that the focus point or center point of an ultrasound beam is set to be at a particular location where the interventional medical device 252 was, is, or is expected to be according to the most current information from the passive ultrasound sensor S1.

After modifying the ultrasound beam pattern at S440, the process returns to S414 where ultrasound beams are emitted to scan the X-planes.

Although not entirely shown or reflected in the embodiment of FIG. 4, a clinical workflow that results in the modified ultrasound beam pattern at S440 may start with inserting the interventional medical device 252 into a patient. An ultrasound probe 230 can then be activated to initiate the automated search for the maximum sensor signal from the passive ultrasound sensor S1 on the interventional medical device. The automated search is performed in X-plane mode, and the maximum signal is sought for each of the two independent planes in X-plane mode in order to identify the location of the passive ultrasound sensor S1 in each of the two planes. The two planes are used because there is a region of overlap between the azimuth plane and the elevation plane which make it possible to combine the two-dimensional position of the interventional medical device 252 in both independent planes to provide the position of the interventional medical device 252 in three dimensions. Once the initial location is identified, the two-dimensional coordinates can be repeatedly obtained as interventional medical device 252 is moved, such that the X-planes automatically follow the device. If the signal at the passive ultrasound sensor S1 on the interventional medical device 252 is lost, the ultrasound probe 230 is repositioned to reacquire the signal.

Figure 5:
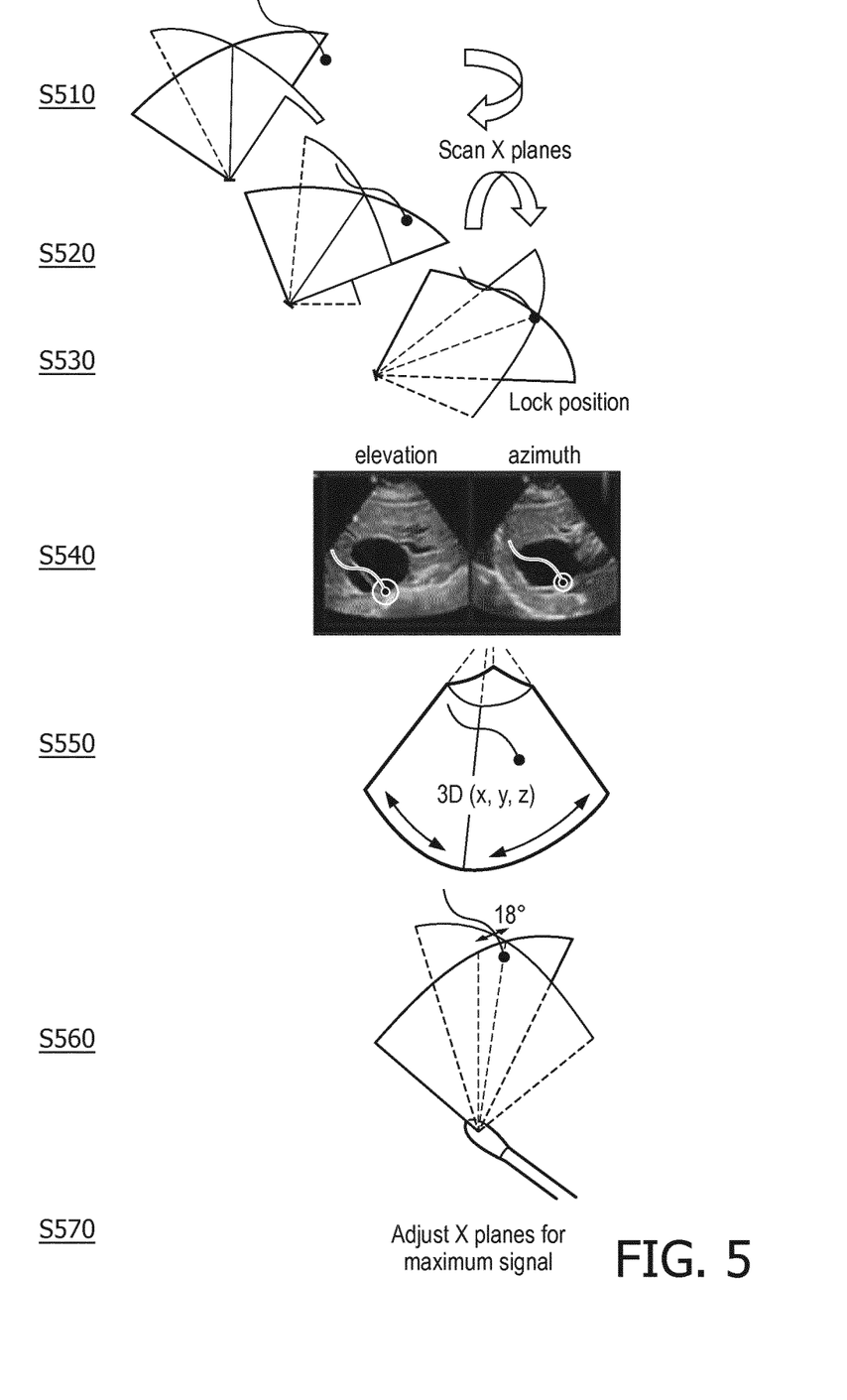
FIG. 5 illustrates a progressive visualization of 3D tracking of interventional medical devices, in accordance with a representative embodiment.

FIG. 5 illustrates a progressive visualization of 3D tracking of interventional medical devices, in accordance with a representative embodiment.

In FIG. 5, the passive ultrasound sensor is indicated by the dot which is first outside of the two planes shown in the uppermost (first) scan at S510. As shown in FIG. 5, the two planes overlap at each of S510, S520, S530 and S560. The two planes shown in each of S510, S520, S530 and S560 are the elevation plane and the azimuth plane in the X-plane mode, and thus may be perpendicular to one another at any one point in time.

At S520, in a second scan, the passive ultrasound sensor is indicated by the dot which is now inside one of the two planes.

At S530, in a third scan, the passive ultrasound sensor is indicated by the dot which is now at the intersection of the two planes, and thus inside both of the two planes. As a result of the passive ultrasound sensor being at the intersection of the two planes at S530, the position of the ultrasound sensor in both sets of two-dimensional coordinates is locked.

At S540, the ultrasound beams are emitted in the X-plane mode, and the location of the interventional medical device 252 is obtained in each two-dimensional view with the respective two-dimensional coordinates X, Z in each two-dimensional view.

At S550, the inter-plane angle between the elevation plane and the azimuth plane is determined, and used together with the two-dimensional coordinates X, Z in each two-dimensional view to determine the three-dimensional coordinates X, Y, Z. The two-dimensional coordinates X, Z are independently determined in each of the elevation plane and the azimuth plane, which in turn provides the ability to obtain the live three-dimensional position of the passive ultrasound sensor S1

At S560, in another scan, the passive ultrasound sensor is indicated by the dot which is inside one of the two planes but not the other. In other words, at S560 the scan reveals that the passive ultrasound sensor has moved relative to the last position or the expected position.

At S570, the X-planes are adjusted to maximize the voltage reading obtained from the next scan, and the process returns to, for example, S530 to confirm that the passive ultrasound sensor is at the intersection of the two X-planes. That is, at S570, the X-planes are repositioned based on the live 3D three-dimensional position of the passive ultrasound sensor S1 obtained at S550.

As explained herein, the adjustment at S570 may be performed automatically in order to follow the passive ultrasound sensor S1. The ultrasound beams emitted in X-plane mode by the ultrasound probe 230 may be emitted initially at the manual control of an interventionalist (e.g., a clinician), but then automatically follow the passive ultrasound sensor S1 based on the processes described herein In other embodiments, one of the two X-planes may be set to separately follow, for example the anatomical region of interest as identified by the interventionalist. In another embodiment, one of the two X-planes can be set to intersect both the passive ultrasound sensor S1 and the anatomical region of interest.

Figure 6:
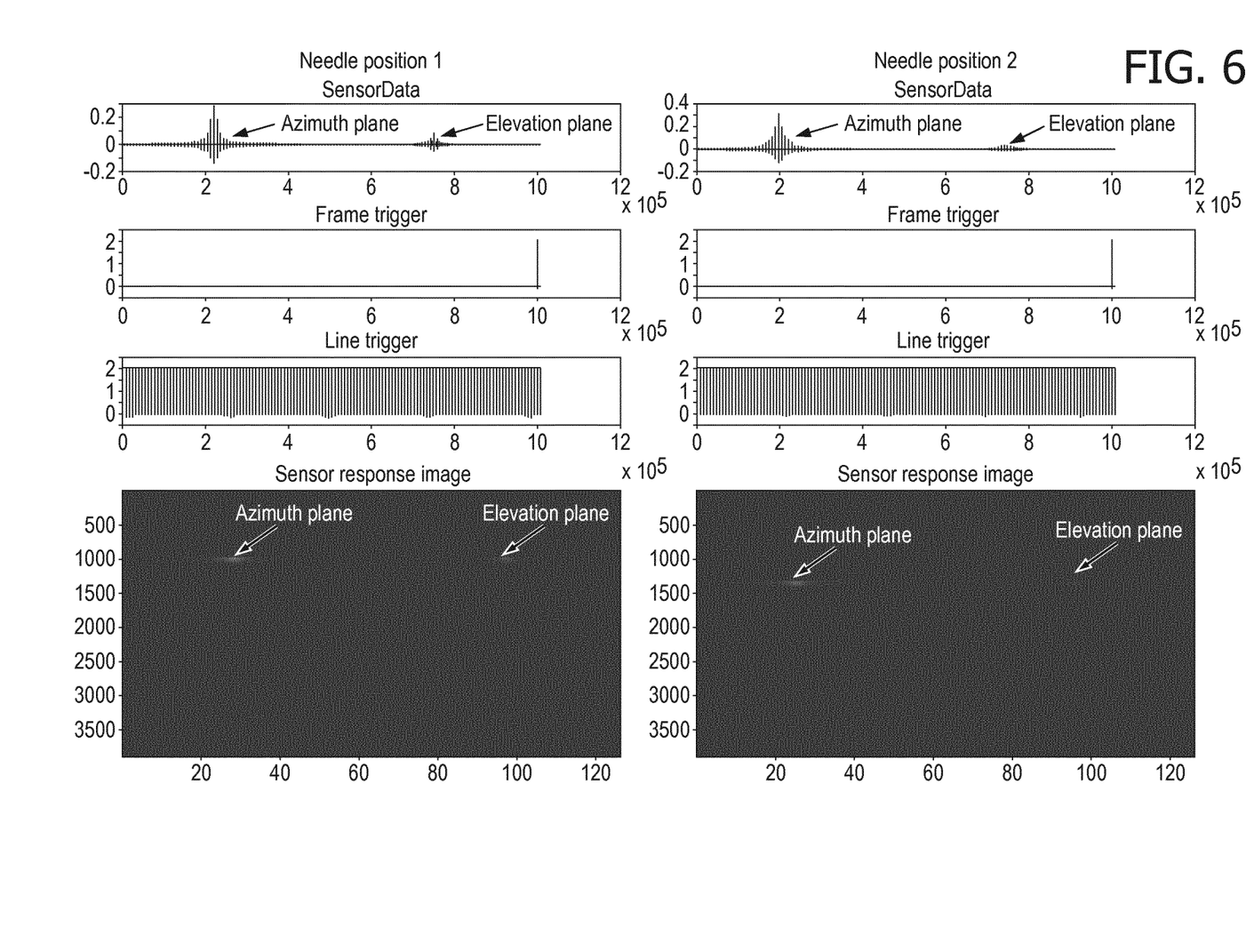
FIG. 6 illustrates an example of signal responses from each plane in X-plane mode in 3D tracking of interventional medical devices, in accordance with a representative embodiment.

FIG. 6 illustrates an example of signal responses from each plane in X-plane mode in 3D tracking of interventional medical devices, in accordance with a representative embodiment.

In FIG. 6, the left side and the right side show different signal responses from the passive ultrasound sensor in both planes of the X-plane mode in consecutive positions of the interventional medical device. That is, the left side corresponds to a first position of the interventional medical device, and is labelled Needle Position 1. The right side corresponds to a second position of the interventional medical device, and is labelled Needle Position 2. Signal response from the device from each of the respective planes, in X-plane mode. Three different sets of signals are shown in each of the two upper boxes. The first (upper) signal is the voltage reading V, which is the sensor data from the passive ultrasound sensor S1. The second (middle) signal is the frame trigger signal, and the third (lower) signal is the line trigger corresponding to each emission of an ultrasound beam.

In FIG. 6, the two larger boxes on the bottom are graphical user interfaces showing the signal responses for the Azimuth plane and the Elevation plane at each of the first position and the second position.

Figure 7:
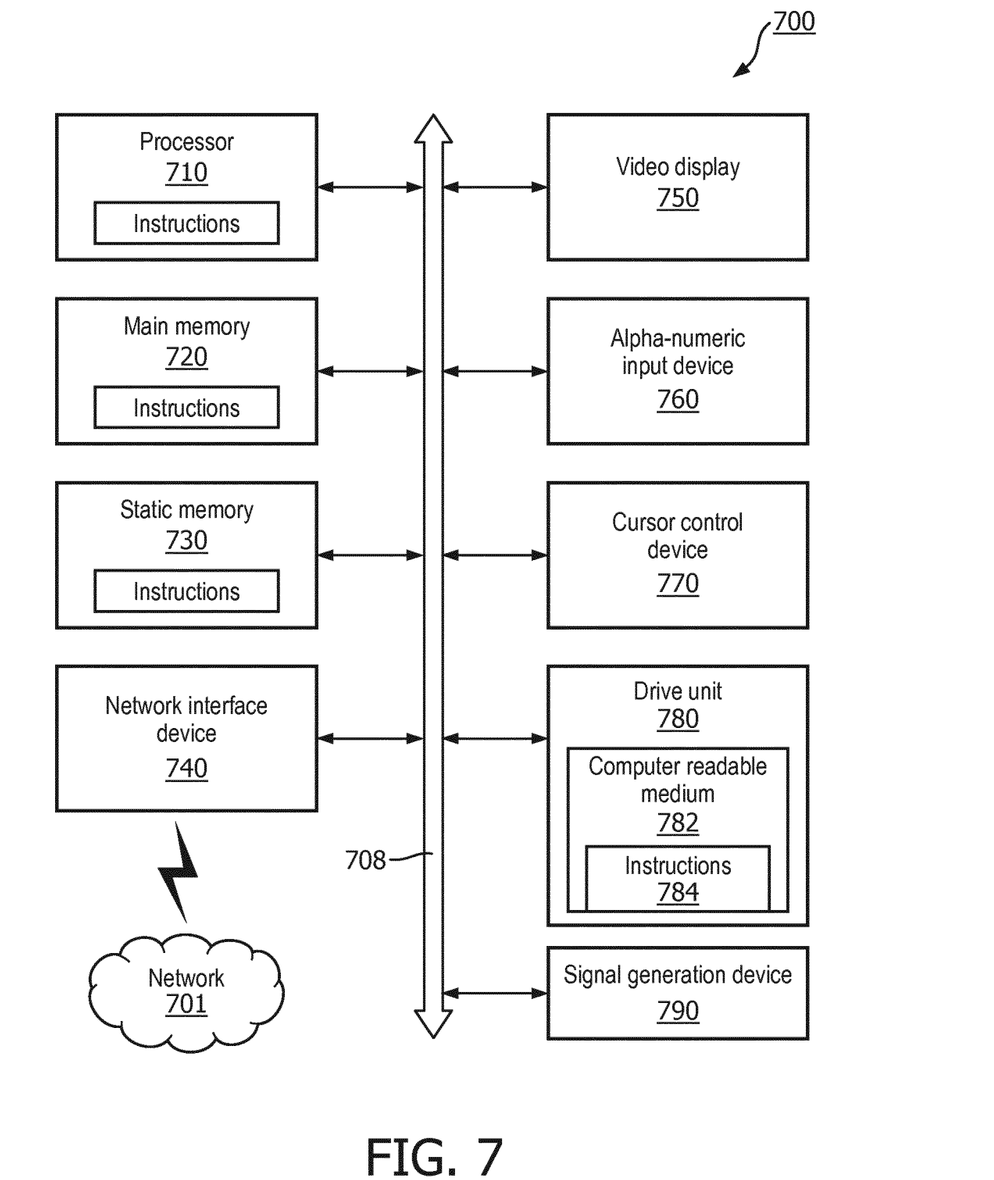
FIG. 7 is an illustrative embodiment of a general computer system, on which a method of 3D tracking of interventional medical devices can be implemented, in accordance with a representative embodiment.

FIG. 7 is an illustrative embodiment of a general computer system, on which a method of 3D tracking of interventional medical devices can be implemented, in accordance with a representative embodiment.

The computer system 700 can include a set of instructions that can be executed to cause the computer system 700 to perform any one or more of the methods or computer based functions disclosed herein. The computer system 700 may operate as a standalone device or may be connected, for example, using a network 701, to other computer systems or peripheral devices. Any or all of the elements and characteristics of the computer system 700 in FIG. 7 may be representative of elements and characteristics of the central station 220, the interventional medical device 252, the ultrasound probe 230, or other similar devices and systems that can include a controller and perform the processes described herein.

In a networked deployment, the computer system 700 may operate in the capacity of a client in a server-client user network environment. The computer system 700 can also be fully or partially implemented as or incorporated into various devices, such as an ultrasound probe 230, a controller, a central station, a control station, a passive ultrasound sensor, a stationary computer, a personal computer (PC), or any other machine capable of executing a set of instructions (sequential or otherwise) that specify actions to be taken by that machine. The computer system 700 can be incorporated as or in a device that in turn is in an integrated system that includes additional devices. In an embodiment, the computer system 700 can be implemented using electronic devices that provide video or data communication. Further, while the computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 includes a processor 710. A processor 710 for a computer system 700 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. Any processor described herein is an article of manufacture and/or a machine component. A processor for a computer system 700 is configured to execute software instructions to perform functions as described in the various embodiments herein. A processor for a computer system 700 may be a general-purpose processor or may be part of an application specific integrated circuit (ASIC). A processor for a computer system 700 may also be a microprocessor, a microcomputer, a processor chip, a controller, a microcontroller, a digital signal processor (DSP), a state machine, or a programmable logic device. A processor for a computer system 700 may also be a logical circuit, including a programmable gate array (PGA) such as a field programmable gate array (FPGA), or another type of circuit that includes discrete gate and/or transistor logic. A processor for a computer system 700 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 700 includes a main memory 720 and a static memory 730 that can communicate with each other via a bus 708. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 700 may further include a video display unit 750, such as a liquid crystal display (LCD), an organic light emitting diode (OLED), a flat panel display, a solid-state display, or a cathode ray tube (CRT). Additionally, the computer system 700 may include an input device 760, such as a keyboard/virtual keyboard or touch-sensitive input screen or speech input with speech recognition, and a cursor control device 770, such as a mouse or touch-sensitive input screen or pad. The computer system 700 can also include a disk drive unit 780, a signal generation device 790, such as a speaker or remote control, and a network interface device 740.

In an embodiment, as depicted in FIG. 7, the disk drive unit 780 may include a computer-readable medium 782 in which one or more sets of instructions 784, e.g. software, can be embedded. Sets of instructions 784 can be read from the computer-readable medium 782. Further, the instructions 784, when executed by a processor, can be used to perform one or more of the methods and processes as described herein. In an embodiment, the instructions 784 may reside completely, or at least partially, within the main memory 720, the static memory 730, and/or within the processor 710 during execution by the computer system 700.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 782 that includes instructions 784 or receives and executes instructions 784 responsive to a propagated signal; so that a device connected to a network 701 can communicate video or data over the network 701. Further, the instructions 784 may be transmitted or received over the network 701 via the network interface device 740.

FIG. 8A illustrates geometry for computing a 3D position using 2D positions from azimuth and elevation planes in 3D tracking of interventional medical devices, in accordance with a representative embodiment.

In FIG. 8A, the thicker outer lines from the origin form the outline of an ultrasound beam. The dashed line is from the origin through and beyond the two-dimensional position of the passive ultrasound sensor S1. The passive ultrasound sensor is indicated by the circle. The thinner line in the middle of the ultrasound beam is the azimuth central axis.

In FIG. 8A, two polar coordinates are used to detect the location of the passive ultrasound sensor relative to the origin. The two polar coordinates in a polar coordinate system are the radium R and the angle theta (θ). The angle theta is an angle between a (vertical) reference line Ref and the dashed line from the origin through and beyond the two-dimensional position of the passive ultrasound sensor S1. In other words, in FIG. 8A, the two-dimensional position of the passive ultrasound sensor can be calculated using time-of-flight measurements that provide the axial/radial distance of the passive ultrasound sensor from the imaging array, and amplitude measurements and knowledge of the beam firing sequence that provide the lateral/angular position of the passive ultrasound sensor S1.

FIG. 8B illustrates additional geometry for computing a 3D position using 2D positions from azimuth and elevation planes in 3D tracking of interventional medical devices, in accordance with a representative embodiment.

In FIG. 8B, the coordinates of the passive ultrasound sensor are shown as X, Z, wherein X is the horizontal direction on the page and Z is the vertical direction on the page. Otherwise, the thicker outer lines in FIG. 8B are the same as in FIG. 8A, and form the outline of the ultrasound beam.

The three-dimensional coordinates X, Y, Z of the passive ultrasound sensor can be computed as described below for FIGS. 8A and 8B. Variables are taken as follows:

Φmin is equal to the minimum elevation sector angle relative to the (vertical) reference line.

θmin is equal to the minimum azimuth sector angle relative to the (vertical) reference line Φdelta is equal to the angle between consecutive elevation beams θdelta is equal to the angle between consecutive azimuth beams R is the distance from the probe origin, such as in millimeters (mm)

Using ultrasound beams with known elevation angles of emission, azimuth angles of emission and emission times, the emitted ultrasound beams can be correlated with voltage readings by the passive ultrasound sensor S1. The three-dimensional coordinates can then be computed as follows:

$$Z = R * \cos(\Phi\text{min} + \text{beamIndex}_{elevation} * \Phi\text{delta}) *$$

$$\cos(\theta\text{min} + \text{beamIndex}_{azimuth} * \theta\text{delta})$$

$$Y = R * \sin(\Phi\text{min} + \text{beamIndex}_{elevation} * \Phi\text{delta}) *$$

$$R = \frac{\cos(\theta\min + \text{beamIndex}_{azimuth} * \theta\text{delta})}{\cos(\theta\min + \text{beamIndex} * \theta\text{delta})}$$

That is, as described above, equations can be used to compute the three-dimensional coordinates X, Y, Z of the passive ultrasound sensor in Cartesian space from the two-dimensional polar coordinates for each of the two planes in the X-plane mode. This leverages the known azimuth and elevation angles of any particular ultrasound beam emitted from the ultrasound probe 230, and the voltage readings by the passive ultrasound sensor S1. The peak voltage readings indicate when an emitted beam best intersects with the passive ultrasound sensor S1, and angular coordinates obtained from both planes in the X-plane mode are used to precisely calculated the three-dimensional coordinates X, Y, Z in the Cartesian space.

Accordingly, 3D tracking of interventional medical devices enables an interventionalist to follow the interventional medical device 252 in X-plane mode using both planes of the X-plane mode. Alternative uses of the X-plane mode can also be provided in the same or a similar manner. For example, one of the planes in the X-plane mode can be set to always image the anatomical region of interest (ROI) annotated by the interventionalist, while the other of the planes follows the passive ultrasound sensor S1. In another embodiment, one plane may be set to always image the anatomical region of interest, and the other plane may be set to intersect both the passive ultrasound sensor and the anatomical region of interest. In either of the examples above where a plane is set to intersect the region of interest, a three-dimensional "distance to target" can also be calculated and displayed since the location of the region of interest and the location of the passive ultrasound sensor are each known in three dimensions.

In another embodiment, an ultrasound probe 230 can be set to alternate between two X-plane views. One X-plane view can be on the central axis of the ultrasound probe 230 and used by the interventionalist to visualize the desired anatomy. The other X-plane view can be set to follow the position of the passive ultrasound sensor S1. The two views can be shown one on top of another on a display, or side by side on a display such as monitor 229. The display can show a top row with the anatomy X-planes, a bottom row with the device X-planes. Moreover, a small illustration of the orientation of the X-plane sets may be provided to help navigate the interventional medical device 252 towards the region of interest in the anatomy.

Although 3D tracking of interventional medical devices has been described with reference to several exemplary embodiments, it is understood that the words that have been used are words of description and illustration, rather than words of limitation. Changes may be made within the purview of the appended claims, as presently stated and as amended, without departing from the scope and spirit of 3D tracking of interventional medical devices in its aspects. Although 3D tracking of interventional medical devices has been described with reference to particular means, materials and embodiments, 3D tracking of interventional medical devices is not intended to be limited to the particulars disclosed; rather 3D tracking of interventional medical devices extends to all functionally equivalent structures, methods, and uses such as are within the scope of the appended claims.

As described above, the orientation of X-planes and the inter-plane angles can be obtained through feedback from the ultrasound probe 230. The teachings herein can be proofed in a laboratory experiment to demonstrate that the interventional medical device 252 that is sufficiently insonified by both planes in an X-plane mode can be tracked when the interventional medical device 252 moves. FIG. 6 shows laboratory results of such tracking from one location to another. Further, since both planes in the X-plane mode are used, the two-dimensional position is obtained in both planes as two separate readings of the two-dimensional position. The two positions in two dimensions can be combined to get the three-dimensional position of the interventional medical device 252 in the ultrasound coordinate space as shown in FIGS. 8A and 8B. The teachings herein thus provide an interventionalist an ability to operate in a high-resolution X-plane mode by using the three-dimensional position of the interventional medical device 252 to alter the firing of the X-plane beams such that the interventional medical device 252 is followed as it moves in the three-dimensional space.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. FIG. 5

As used herein, the term "or" should be interpreted as a disjunctive "or." Further, the term "or" and the term "and" when prefaced by the term "at least one of" or the term by "one or more of" should be interpreted as a disjunctive list such that, for example, a list of "at least one of A or B" or a list of "one or more of A and B" or a list of "A or B" should be interpreted to include either A or B, one of A and one of B, a combination of one or more of each of A and B; both A and B; or combinations of one or more of A and B, and such other combinations as relevant to the recited list or terms consistent with the corresponding description in the specification.

The invention claimed is:

1. A controller for tracking an interventional medical device in three dimensions, the controller comprising:
a memory that stores instructions; and
a processor configured to execute the instructions,
wherein, when executed by the processor, the instructions cause the processor to:
determine a three-dimensional (3D) location of the interventional medical device using two-dimensional (2D) ultrasound imaging, wherein the 2D ultrasound imaging comprises a two-plane mode configured to obtain responses from a sensor on the interventional medical device; and
modify ultrasound beam patterns fired in the two-plane mode based on the 3D location of the interventional medical device,
wherein the 3D location comprises a X-coordinate, a Y-coordinate, and a Z-coordinate,
wherein, to determine the X-coordinate and the Z-coordinate, the instructions, when executed by the processor, further cause the processor to:
determine a combination of an elevation plane and an azimuthal plane in the two-plane mode that obtains a maximum sensor response from the sensor;
determine, based on the maximum sensor response, a location of the interventional medical device in the elevation plane to be the X-coordinate; and
determine, based on the maximum sensor response, a location of the interventional medical device in the azimuthal plane to be the Z-coordinate,
wherein the instructions, when executed by the processor, further cause the processor to determine the Y-coordinate based on an inter-plane angle between the elevation plane and the azimuthal plane.

2. The controller of claim 1, wherein, to modify the ultrasound beam patterns fired in the two-plane mode, the instructions, when executed by the processor, further cause the processor to:
reposition at least one of the elevation plane or the azimuthal plane based on the 3D location of the interventional medical device as the interventional medical device moves.

3. The controller of claim 1, wherein the instructions, when executed by the processor, further cause the processor to:
determine the 3D location in real-time during a medical intervention.

4. The controller of claim 1, wherein the instructions, when executed by the processor, further cause the processor to:
follow the interventional medical device in the three dimensions by modifying the ultrasound beam patterns fired in the two-plane mode based on repeatedly determining the 3D location of the interventional medical device.

5. The system of claim 1, wherein the instructions, when executed by the processor, further cause the processor to:
perform an automated search in the two-plane mode to initially locate the interventional device.

6. The system of claim 1, wherein the sensor is a passive ultrasound sensor.

7. The controller of claim 5,
wherein the instructions, when executed by the processor, further cause the processor to:
sweep through a three-dimensional volume in the two-plane mode in multiple different combinations of the elevation plane and the azimuthal plane; and
identify the maximum sensor response from among the multiple different combinations to identify the combination of the elevation plane and the azimuthal plane used to determine the first location and the second location.

8. The controller of claim 6,
wherein the responses comprises ultrasound readings,
wherein the instructions, when executed by the processor, further cause the processor to:
determine the first location of the interventional medical device in the elevation plane and the second location of the interventional medical device in the azimuthal plane based on the ultrasound readings.

9. The controller of claim 7, wherein the instructions, when executed by the processor, further cause the processor to:
follow the interventional medical device in the three dimensions by modifying the ultrasound beam patterns fired in the two-plane mode based on repeatedly determining the 3D location of the interventional medical device.

10. The controller of claim 9, wherein the instructions, when executed by the processor, further cause the processor to:
determine that the interventional medical device cannot be located while following the interventional medical device; and
based on determining that the interventional medical device cannot be located, re-determine the three-dimensional 3D location.

11. The controller of claim 1, wherein the instructions, when executed by the processor, further cause the processor to:
follow the interventional medical device in the three dimensions by modifying one of the elevation plane or the azimuthal plane in the two-plane mode based on repeatedly determining the 3D location of the interventional medical device; and
follow an anatomical region of interest in the three dimensions by modifying the other of the elevation plane or the azimuthal plane in the two-plane mode based on repeatedly determining the 3D location of the interventional medical device.

12. The controller of claim 1, wherein the instructions, when executed by the processor, further cause the processor to:
follow an anatomical region of interest in the three dimensions by modifying one of the elevation plane or the azimuthal plane in the two-plane mode based on repeatedly determining the 3D location of the interventional medical device; and
follow the anatomical region of interest and the interventional medical device in the three dimensions by modifying the other of the elevation plane or the azimuthal plane in the two-plane mode based on repeatedly determining the 3D location of the interventional medical device.

13. The controller of claim 1,
wherein the instructions, when executed by the processor, further cause the processor to:
control a display to alternate between views of the two-plane mode,
wherein the views of the two-plane mode comprise:
a view of an anatomical region of interest; and
a view of one of the first location of the interventional medical device in the elevation plane or the second location of the interventional medical device in the azimuthal plane.

14. A method for tracking an interventional medical device in three dimensions, the method comprising:
determining a three-dimensional (3D) location of the interventional medical device using two-dimensional (2D) ultrasound imaging, wherein the 2D ultrasound imaging comprises a two-plane mode that obtains responses from a sensor on the interventional medical device; and
modifying ultrasound beam patterns fired in the two-plane mode based on the 3D location of the interventional medical device,
wherein the 3D location comprises a X-coordinate, a Y-coordinate, and a Z-coordinate,
wherein determining the X-coordinate and the Z-coordinate comprises:
determining a combination of an elevation plane and an azimuthal plane in the two-plane mode that obtains a maximum sensor response from the sensor;
determining, based on the maximum sensor response, a first location of the interventional medical device in the elevation plane to be the X-coordinate; and
determining, based on the maximum sensor response, a second location of the interventional medical device in the azimuthal plane to be the Z-coordinate;
wherein the Y-coordinate is determined based on an inter-plane angle between the elevation plane and the azimuthal plane.

15. A system for tracking an interventional medical device in three dimensions, the system comprising:
an interventional medical device;
an ultrasound probe that captures imagery in a space that includes the interventional medical device; and
a processor in communication with a memory, wherein the processor configured to:
determine a three-dimensional (3D) location of the interventional medical device using two-dimensional (2D) ultrasound imaging, wherein the 2D ultrasound imaging comprises a two-plane mode configured to obtain responses from a sensor on the interventional medical device; and
modify ultrasound beam patterns fired in the two-plane mode based on the 3D location of the interventional medical device,
wherein the 3D location comprises a X-coordinate, a Y-coordinate, and a Z-coordinate,
wherein, to determine the X-coordinate and the Z-coordinate, the processor is configured to:
determine a combination of an elevation plane and an azimuthal plane in the two-plane mode that obtains a maximum sensor response from the sensor;
based on the maximum sensor response, a first location of the interventional medical device in the elevation plane to be the X-coordinate; and
determine, based on the maximum sensor response, a second location of the interventional medical device in the azimuthal plane to be the Z-coordinate,
wherein the processor is configured to determine the Y-coordinate based on an inter-plane angle between the elevation plane and the azimuthal plane.

16. The method of claim 14, wherein modifying ultrasound beam patterns fired in the mode includes:
repositioning at least one of the elevation plane or the azimuthal plane based on the 3D location of the interventional medical device as the interventional medical device moves.

17. The method of claim 14, wherein the 3D location is calculated in real-time during a medical intervention.

18. The system of claim 15, wherein, to modify the ultrasound beam patterns fired in the two-plane mode, the processor is configured to:
reposition at least one of the elevation plane or the azimuthal plane based on the 3D location of the interventional medical device as the interventional medical device moves.

19. The system of claim 15, wherein the processor is configured to calculate the 3D location in real-time during a medical intervention.

* * * * *